(12) United States Patent
Reynolds, Jr. et al.

(10) Patent No.: US 7,562,911 B2
(45) Date of Patent: Jul. 21, 2009

(54) WEDGE THREAD WITH SEALING METAL

(75) Inventors: Harris A. Reynolds, Jr., Houston, TX (US); Philip A. Huff, Spring, TX (US); Keith Pruden, Katy, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 341 days.

(21) Appl. No.: 11/337,994

(22) Filed: Jan. 24, 2006

(65) Prior Publication Data

US 2007/0170722 A1  Jul. 26, 2007

(51) Int. Cl.
*F16L 25/00* (2006.01)
(52) U.S. Cl. .................................................. 285/334
(58) Field of Classification Search .............. 285/333, 285/334, 55
See application file for complete search history.

(56) References Cited

U.S. PATENT DOCUMENTS

| | | |
|---|---|---|
| 244,479 A | 7/1881 | Patterson |
| 771,935 A | 10/1904 | Reynolds |
| 802,138 A | 10/1905 | Byshe |
| 1,969,029 A | 8/1934 | Ostertag |
| 2,145,168 A | 1/1939 | Flagg |
| 2,333,968 A | 11/1943 | Winter |
| 2,512,426 A | 6/1950 | Hartley |
| 3,427,707 A | 2/1969 | Nowosadko |
| 3,455,581 A | 7/1969 | Politz |
| 3,936,125 A | 2/1976 | Hutter |
| 4,133,095 A | 1/1979 | Lewis et al. |
| RE30,647 E | 6/1981 | Blose |
| 4,355,222 A | 10/1982 | Geithman et al. |
| 4,445,265 A | 5/1984 | Olson et al. |
| 4,468,309 A * | 8/1984 | White ........................ 427/528 |
| 4,527,815 A | 7/1985 | Frick |
| 4,534,585 A | 8/1985 | Saliger |
| 4,589,187 A * | 5/1986 | Stone et al. .................... 29/458 |
| 4,703,954 A | 11/1987 | Ortloff |
| 4,758,025 A * | 7/1988 | Frick ........................... 285/55 |
| 4,828,295 A * | 5/1989 | Plaquin et al. .............. 285/334 |
| 4,830,411 A * | 5/1989 | Tsuru et al. ................. 285/334 |
| 4,871,194 A * | 10/1989 | Kawashima et al. .......... 285/55 |
| 4,911,245 A | 3/1990 | Adamek et al. |
| 4,917,409 A * | 4/1990 | Reeves ........................ 285/334 |
| 5,067,734 A | 11/1991 | Boehm, Jr. |

(Continued)

FOREIGN PATENT DOCUMENTS

EP  0 246 387 A1  11/1987

(Continued)

OTHER PUBLICATIONS

Patent Abstracts of Japan; Publication No. 04-060294 A; Dated Feb. 26, 1992; 1 page.

(Continued)

*Primary Examiner*—David E Bochna

(57) ABSTRACT

Threaded connections including a pin member and a box member and a sealing metal. The pin member and the box member have wedge threads formed thereon, and the sealing metal is disposed between the wedge threads of the pin member and the box member. The sealing metal has a melting point lower than a tempering temperature of the pin member and the box member.

23 Claims, 6 Drawing Sheets

U.S. PATENT DOCUMENTS

| | | | |
|---|---|---|---|
| 5,094,730 A | 3/1992 | Niehaus et al. | |
| 5,211,226 A | 5/1993 | Hendrickson et al. | |
| RE34,467 E | 12/1993 | Reeves | |
| 5,360,239 A | 11/1994 | Klementich | |
| 5,427,418 A * | 6/1995 | Watts | 285/94 |
| 5,450,905 A | 9/1995 | Brammer et al. | |
| 5,454,605 A | 10/1995 | Mott | |
| 5,492,373 A | 2/1996 | Smith | |
| 5,678,608 A * | 10/1997 | Fontana | 138/96 T |
| 6,206,436 B1 | 3/2001 | Mallis | |
| 6,419,147 B1 | 7/2002 | Daniel | |
| 6,578,880 B2 | 6/2003 | Watts | |
| 6,712,403 B1 | 3/2004 | Dusevic | |
| 6,722,706 B2 | 4/2004 | Church | |
| 6,811,189 B1 * | 11/2004 | DeLange et al. | 285/333 |
| 6,846,779 B1 | 1/2005 | Hinterwaldner et al. | |
| 6,921,110 B2 * | 7/2005 | Morotti et al. | 285/94 |
| 6,971,681 B2 * | 12/2005 | Dell'Erba et al. | 285/55 |
| 7,334,634 B1 * | 2/2008 | Abel | 166/85.4 |
| 7,350,830 B1 * | 4/2008 | DeLange et al. | 285/334 |
| 2004/0070154 A1 | 4/2004 | Casey et al. | |
| 2005/0118364 A1 | 6/2005 | Guise et al. | |

FOREIGN PATENT DOCUMENTS

| | | |
|---|---|---|
| EP | 0 786 616 B1 | 7/2002 |
| JP | 04-060294 A | 2/1992 |

OTHER PUBLICATIONS

Patent Abstract; Patent No. EP-0 246 387; datedNov. 25, 1987; 1 page.

Metals Handbook, Ninth Edition, vol. 15, Casting; pp. 323-327.

* cited by examiner

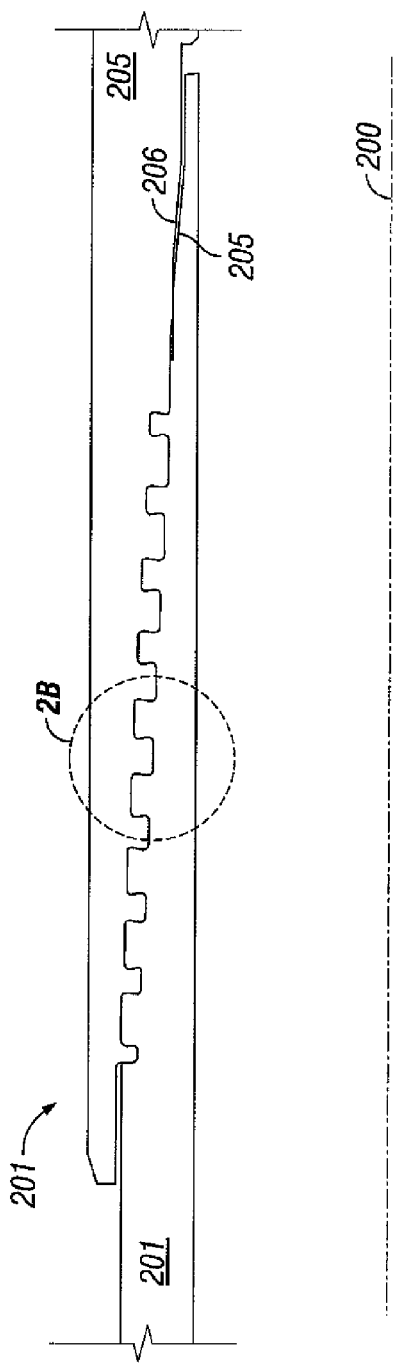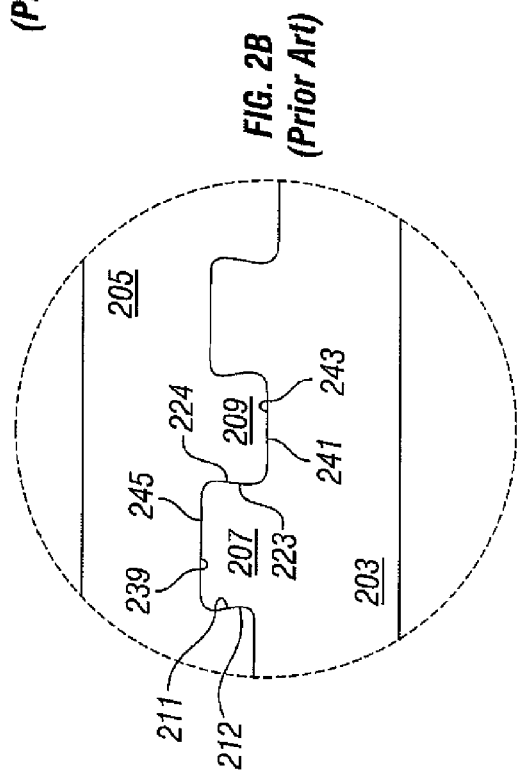
FIG. 2A
(Prior Art)
FIG. 2B
(Prior Art)

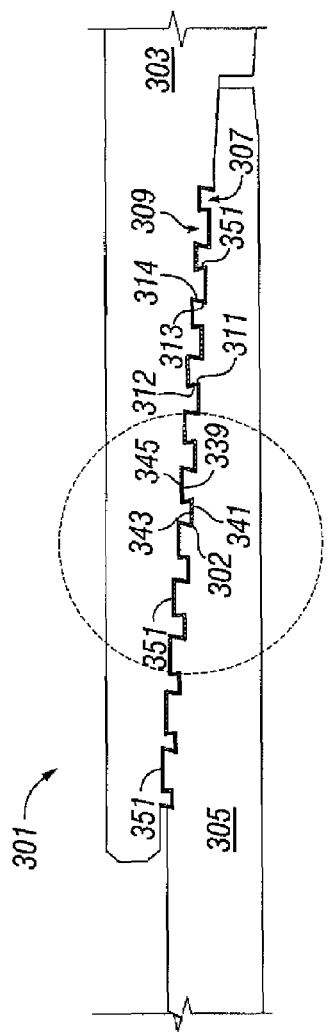
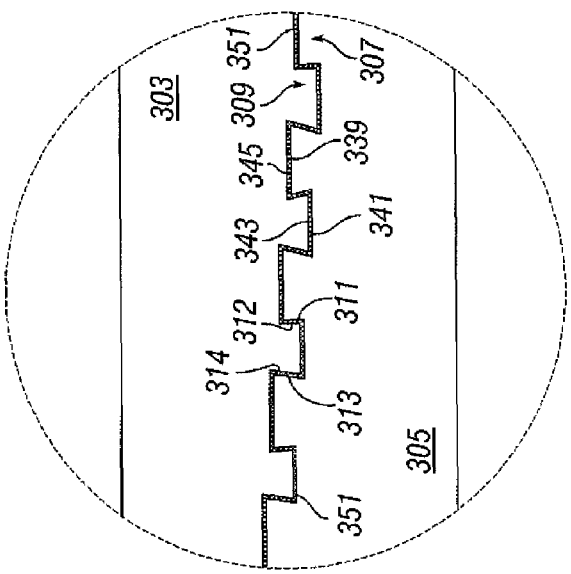
FIG. 3A
FIG. 3B

WEDGE THREAD WITH SEALING METAL

BACKGROUND OF INVENTION

1. Field of the Invention

The invention relates generally to threaded connections used in the oil and gas industry. Specifically, the invention relates to an improved threaded connection for use in blowout preventers and oilfield tubulars.

2. Background Art

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe, which may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

One type of threaded connection commonly used to form a thread seal in oilfield tubulars is a wedge thread. In FIG. 2, a prior art connection 201 having a wedge thread is shown. "Wedge threads" are characterized by threads, regardless of a particular thread form, that increase in width (i.e., axial distance between load flanks 211 and 212 and stab flanks 213 and 214) in opposite directions on a pin member 203 and a box member 205. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIG. 2, on the pin member 201, a pin thread crest 239 is narrow towards the distal end of the pin member 201 while a box thread crest 243 is wide. Moving along an axis 200 (from right to left), the pin thread crest 239 widens while the box thread crest 243 narrows. In FIG. 2, the threads are tapered, meaning that a pin thread 207 increases in diameter from beginning to end while a box thread 209 decreases in diameter in a complimentary manner. Having a thread taper can improve the ability to stab the pin member 203 into the box member 205 and distributes stress in the connection.

Generally, thread seals are difficult to achieve with non-wedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. The above thread forms are examples of thread forms that may be used for embodiments of the invention. Generally, open thread forms such as buttress or stub are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal may be accomplished as a result of the contact pressure caused by interference over at least a portion of the connection between the pin load flank 211 and the box load flank 212 and between the pin stab flank 213 and the box stab flank 214, which occurs when the connection 201 is made-up. Close proximity or interference between the roots 241 and 245 and crests 239 and 243 completes the thread seal when it occurs over at least a portion of where the flank interference occurs. Generally, higher pressure may be contained with increased interference between the roots and crests ("root/crest interference") on the pin member 203 and the box member 205 and by increasing flank interference. The particular connection shown in FIG. 2 also includes a metal-to-metal seal that is accomplished by contact pressure between corresponding seal surfaces 204 and 206, respectively located on the pin member 203 and box member 205.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For tapered wedge threads that are designed to have root/crest clearance, the clearance decreases as the connection is made-up. Regardless of the design of the wedge thread, corresponding flanks come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection, however, this also increases stress on the connection during make-up, which could lead to failure during use.

Improving the sealing reliability of the thread seal of the wedge threads would increase the usefulness of the wedge thread connections. As shown above, wedge threads are most commonly used with threaded connections in oilfield tubulars, but can also be incorporated into other oilfield applications. Thus, it would be desirable to obtain better sealing capability for a connection with wedge threads to incorporate wedge thread connections into other applications.

SUMMARY OF INVENTION

In one aspect, the present invention relates to a threaded connection. The threaded connection includes a pin member having a pin thread formed thereon, wherein the pin thread comprises a wedge thread comprising a pin thread crest, a pin thread root, a pin load flank, and a pin stab flank. The threaded connection further includes a box member having a box thread formed thereon, wherein the box thread comprises a wedge thread comprising a box thread crest, a box thread root, a box load flank, and a box stab flank. The threaded connection further includes a sealing metal disposed at least between the pin thread and the box thread. The sealing metal has a lower melting point than a tempering temperature of the pin member and the box member.

In another aspect, the present invention relates to a method of forming a threaded connection having a sealing metal comprising a pin member and a box member having wedge threads formed thereon. The method includes depositing a sealing metal on at least a portion of one of the pin member and the box member, torquing the pin member and the box member to an intermediate selected make-up, and heating the threaded connection to at least a melting point of the sealing metal.

Other aspects and advantages of the invention will be apparent from the following description and the appended claims.

BRIEF DESCRIPTION OF DRAWINGS

FIG. 2 shows a prior art connection having a wedge thread.

FIG. 3 shows a connection with wedge threads in accordance with an embodiment of the present invention.

DETAILED DESCRIPTION

In one aspect, the present invention provides connections having a sealing metal. More specifically, select embodiments of the present invention comprise threaded connections with wedge threads having a sealing metal disposed between the threads of the connections.

Sealing Metal

As is known, a pin member and a box member of a wedge thread connection are usually comprised of a steel alloy base metal. A sealing metal, as used in embodiments of the present invention, may be a number of different metals or metal alloys. For example, the sealing metal can be a metal or metal alloy having a higher hardness than the base metal of the pin member and the box member of the connection, such as nickel. Alternatively, the sealing metal can be a metal or metal alloy having a lower hardness than the base metal of the pin member and the box member of the connection, such as tin, lead, bismuth, indium, copper, and/or zinc. It is preferable that the sealing metal have a lowering melting point than the tempering temperature of the base metal of the pin member and the box member. Generally, the tempering temperature of the base metal of the pin member and the box member is about 950° F.-1200° F. A sealing metal with a melting point lower than this range is preferable. Additionally, when exposed to hydrogen sulfide, $H_2S$, it is preferable the sealing metal not react with it. Certain metals can react with hydrogen sulfide to produce sulfides or have hydrogen sulfide cause Sulfide Stress Corrosion Cracking ("SSCC"). Oilfield equipment can be exposed to hydrogen sulfide and therefore is required to meet necessary safety requirements.

Figure 7:
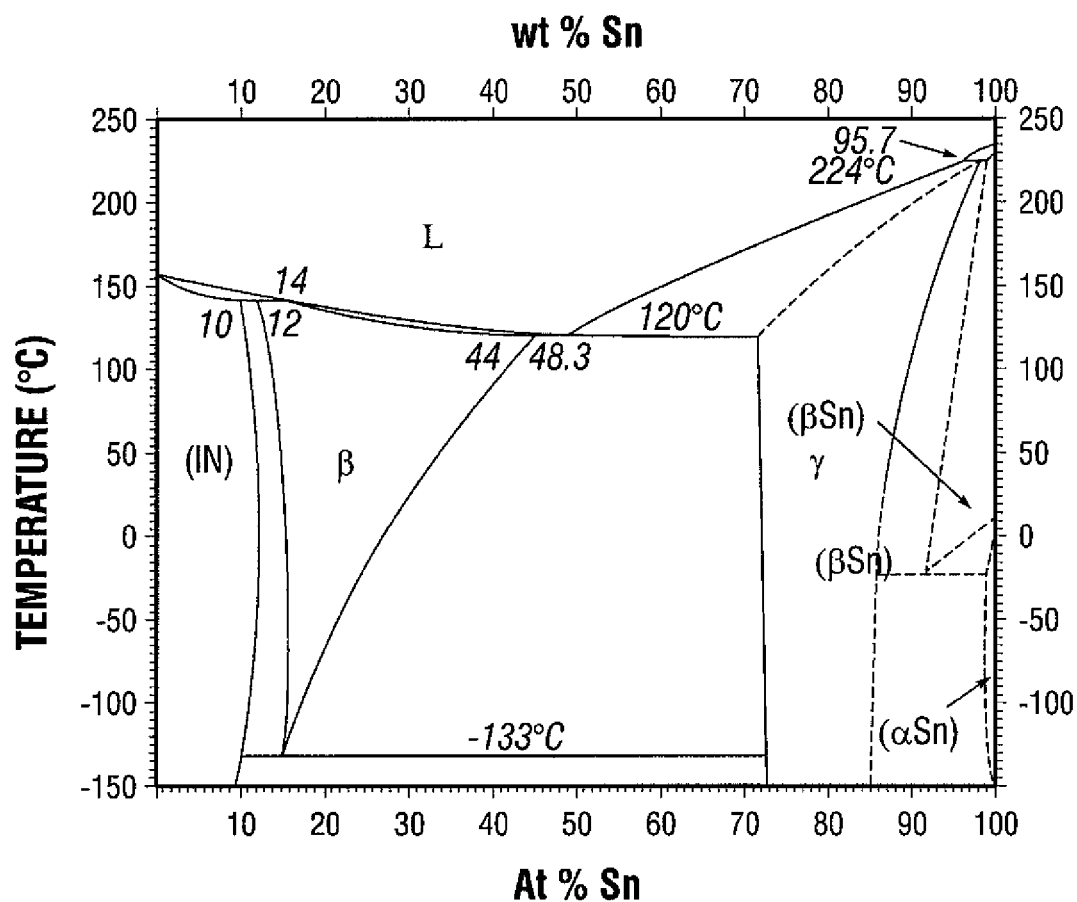
FIG. 7 shows a phase diagram for a tin-indium alloy.

A preferable sealing metal in some embodiments is a metal alloy of tin and indium ("tin—indium"). Tin—indium is a eutectic mixture. As used herein, a "eutectic mixture" refers to a mixture of two or more elements that has a lower melting point than the elements in the eutectic mixture. In FIG. 7, a phase diagram for tin-indium is shown. As shown in the phase diagram in FIG. 7, the melting point increases with increased tin content for tin-indium having greater than 50 wt. % tin. Adjusting the proportion of tin and indium allows for a melting point to be selected based on the intended use of the sealing metal. For example, in one embodiment the metal alloy can be tin-indium having about 90 wt. % tin and about 10 wt. % indium to provide a melting point of about 210 to 215° C. (410 to 420° F.). As the percentage of indium then decreases, the melting point of the metal alloy increases. At about 95 wt. % tin and about 5 wt. % indium, tin-indium has a melting point of about 220 to 225° C. (428 to 437° F.). A metal alloy of tin and indium could, therefore, have a lower melting point than the typical tempering temperatures of the steel alloy base metal for the threaded connection. If a particularly low melting point is desired, tin-indium with about 50 wt. % tin and 50 wt. % indium provides a melting point of about 120° C. (248° F.). If a still lower melting point is desired, another sealing metal may be used. One advantage for the use of tin-indium is that the indium may aid in suppressing the tendency of tin to form sulfides with hydrogen sulfide. The specific percentages used for the tin and indium can be varied based upon the technique used to deposit the sealing metal upon the connection, in addition to the environment in which the connection will be used. For example, if the connection is to be used in a "hot-hole" wellbore, in which the temperature may be greater than 280° F., the sealing metal can be selected to have a melting point greater than the environment to avoid melting the sealing metal during use. Those having ordinary skill in the art will appreciate that the specific alloy content of other sealing metals, in addition to tin-indium, may be adjusted according to desired melting points and other physical properties without departing from the scope of the present invention.

Referring to FIG. 3, a threaded connection 301 in accordance with an embodiment of the present invention is shown. The connection 301 includes a pin member 303 and a box member 305. The pin member 303 has a tapered thread 307, which makes-up to a tapered thread 309 on the box member 305. In this embodiment, the tapered threads 307 and 309 are wedge threads, which allow for the connection 301 to not have a positive stop torque shoulder to make-up the pin member 303 and the box member 305. The threads 307 and 309 include pin load flanks 311 and pin stab flanks 313, which correspond with box load flanks 312 and box stab flanks 314, respectively. The thread 307 on the pin member 303 has a pin crest 339 and a pin root 341 and the thread 309 on the box member 305 has a box crest 343 and a box root 345. The pin crest 339 corresponds with the box root 345, and the pin root 341 corresponds with the box crest 343.

Continuing with FIG. 3, the connection 301 has a equivalence point 302. As used herein, the "equivalence point" is the point at which an adjacent root and crest of the wedge thread are substantially equal in width. The equivalence point 302 is the center of the threaded portion of the pin and box members 303 and 305. The equivalence point 302 can be used as a reference point when referring to specific features of the connection 301, or when referring to specific thread pitches in the threads 307 and 309. For example, the threaded connection 301 has a thread diameter, which is the major diameter of the pin member 303 at the equivalence point 302. Because the threads 307 and 309 of the connection 301 are tapered, the diameter of the thread 307 of the pin member 302 changes. The reference of a equivalence point 302 allows for the thread diameter of the connection 301 to be easily determined. Also, the threads 307 and 309 have a dovetailed thread form. As mentioned previously, other thread forms can be used for the threads without departing from the scope of the present invention.

Referring still to FIG. 3, a sealing metal 351 is disposed between the threads 307 and 309. Specifically, the sealing metal 351 is disposed in this embodiment as a layer between all of the roots, crests, and flanks of the pin member and the box member. However, in other embodiments, the sealing metal may be selectively disposed on specific pitches of the threads on the pin member and/or the box member. For example, the sealing metal may be disposed only on the pitches of the threads of the connection at the equivalence point, or in another embodiment at the pitches of the threads furthest from the equivalence point. Alternatively, the sealing metal may be selectively disposed on certain features of the threaded connection. For example, the sealing metal can be disposed on only the flanks of the threads of the pin member and the box member, or disposed on only the roots and crests of the pin member and the box member. The specific location of the sealing metal on the wedge threads of the connection is not a limitation on the scope of the present invention.

Figure 4A:
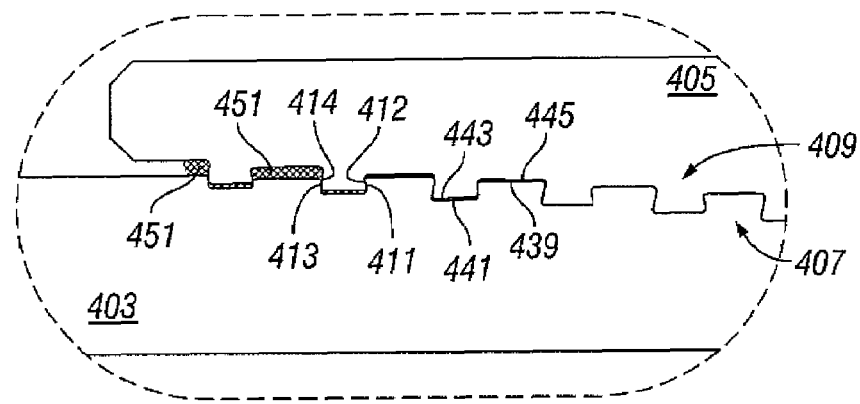
FIG. 4 shows a connection with wedge threads in accordance with an embodiment of the present invention.
Figure 4:
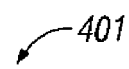
Figure 4B:
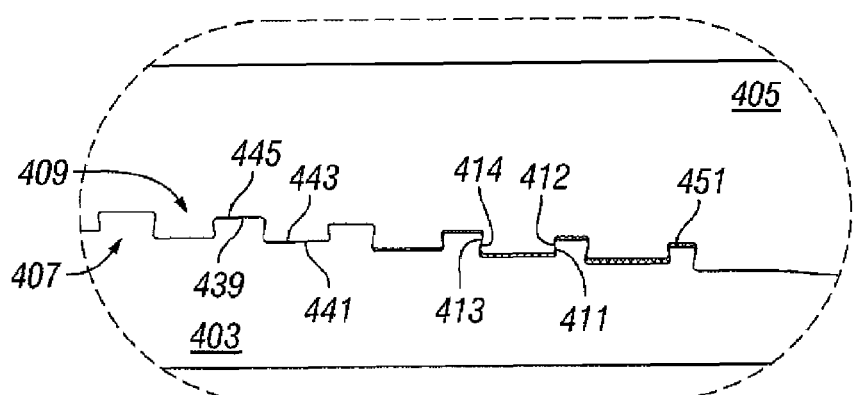

Referring now to FIG. 4, a threaded connection 401 having wedge threads in accordance with an embodiment of the present invention is shown. The threaded connection 401 includes a pin member 403 with a wedge thread 407 that makes-up to a box member 405 with a wedge thread 409. The thread 407 includes pin load flanks 411 with a pin load flank height and pin stab flanks 412 with a pin stab flank height. The thread 409 includes box load flanks 413 with a box load flank height and box stab flanks 414 with a box stab flank height. At equivalence point 402 on the connection 401, the pin and box load and stab flanks are substantially the same height. The heights of the pin and box load and stab flanks are then decreased in both directions relative to the heights at the equivalence point 402. Thus, a selected clearance develops between the pin crests 439 and the box roots 445 and between the pin roots 441 and the box crests 443. A sealing metal 451 is disposed in the selected clearances between the pin crests 439 and the box roots 445 and the pin roots 441 and the box crests 443. In other embodiments, instead of the selected clearance being substantially zero at the equivalence point and increasing in both directions relative to the equivalence point, the selected clearance can be substantially the same across the entire threaded connection. The size and location of the selected clearance across the threaded connection is not a limitation on the scope of the present invention.

Figure 8:
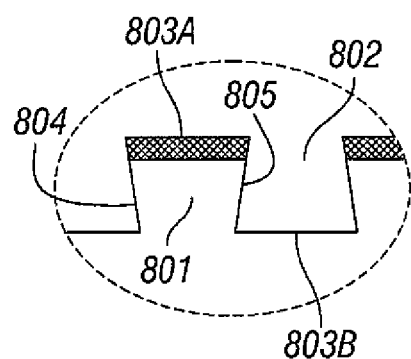
FIG. 8 shows a portion of wedge thread in accordance with an embodiment of the present invention.

An economical technique for using the sealing metal is to simply apply a generally even coating of the sealing metal onto either the pin thread or the box thread. The pin thread is generally the easiest for applying the sealing metal because of its external location. With such a technique, the sealing metal will be disposed on both the load and stab flanks of the pin thread. During make-up, the corresponding load flanks 805 and stab flanks 804 of the pin thread 801 and the box thread 802 will contact each other and squeeze out the sealing metal therebetween, as shown in FIG. 8. The sealing metal may be heated to its melting point to flow, or the shearing of the sealing metal between the flanks may displace the sealing metal. The displaced sealing metal will then migrate to fill the selected root/crest clearance(s) 803A and 803B. In one embodiment, the selected clearance may only be between the pin crest and the box root (selected root/crest clearance 803A), or only between the pin root and the box crest (selected root/crest clearance 803B). To select a root/crest clearance, volume balancing of the sealing metal may be used. Assuming an even deposition of the sealing metal, the total volume of the root/crest clearance 803A and 803B may be selected so that it can contain both the initially deposited sealing metal and that which is displaced from between the load flanks 805 and the stab flanks 804. Because the relative dimensions of roots and crests vary along the helix of the thread, the dimensions at the equivalence point of the connection may be used to provide a sufficient two-dimensional estimate for volume balancing of the sealing metal. The accuracy of the estimate based on the equivalence point will be adversely affected by any varying features of the connection, such as a variable wedge ratio or thread height, but the equivalence point should still provide sufficient accuracy for such an embodiment. Alternatively, for embodiments in which there is clearance between substantially all roots and crests, the sum of the widths of an adjacent root and crest may be used for volume balancing calculations.

To achieve volume balancing, the length of the load flanks and stab flanks relative to the root/crest width may be used. The "length" of the load flanks and the stab flanks refers to the distance from the root to the crest along the load flanks and the stab flanks. In contrast, flank "height" refers to the radial distance from crest to root. The cross-sectional "area" of sealing metal may be calculated based on the thickness of the sealing metal deposited on the thread. Note that the amount of sealing metal deposited on the roots and crests should be taken into account for selecting the root/crest clearance. A volume balancing equation in accordance with one embodiment of the present invention is shown below.

$$A_C + A_D = x(L_A + L_B + L_C + L_D)$$

Wherein, $A_C$ is the area of root/crest clearance 803A, $A_D$ is the area of the root/crest clearance 803B, x is the sealing metal thickness, $L_A$ is the length of stab flanks 804, $L_B$ is the length of the load flanks 805, $L_C$ is the pin crest width, and $L_D$ is the pin root width.

The above volume balancing equation assumes a constant sealing metal thickness "x" on the load flank, stab flank, root, and crest of the pin thread. The gap between the roots and crests can be calculated by dividing the root/crest clearance areas by their corresponding root and crest widths. Those having ordinary skill in the art will be able to adjust the volume balancing equation appropriately to account for different thicknesses on the portions of the threads. If only one selected root/crest clearance exists (either 803A or 803B), then that area would be about the area of x multiplied by the pin crest width, pin root width, pin load flank, and the pin stab flank. Although the above equations are demonstrated with respect to an embodiment with sealing metal disposed on only the pin thread, those having ordinary skill in the art will be able to use these teachings for the box thread as well.

Figure 6:
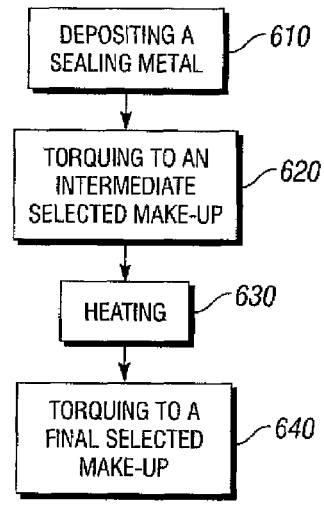
FIG. 6 shows a flow chart illustrating one method of forming a threaded connection with wedge threads in accordance with an embodiment of the present invention.

FIG. 6 shows a flow chart illustrating a method of forming a threaded connection having a sealing metal in accordance with an embodiment of the present invention. In a select embodiment, for example, a connection (such as described in reference to FIGS. 3 and 4) having a wedge thread on the pin and the box members may be made-up in accordance with the method described hereafter. As a first step 610, a sealing metal is deposited on at least a portion of the wedge thread on the pin member and/or the box member. Next, after the sealing metal is deposited, torque is applied 620 to the pin member and the box member of the connection to an intermediate selected make-up. Torque may be applied until either a selected intermediate make-up torque or a selected relative intermediate position between the pin member and the box member is reached. Depending upon the properties of the sealing metal, the sealing metal deposited upon the wedge threads can then assist in torquing of the connection by acting as a lubricant, reducing or eliminating the need for thread dope.

After torquing to intermediate make-up, the connection may be heated 630. Preferably, the connection is heated to a temperature above the melting point of the sealing metal and below the tempering temperature of the base metal of the pin member and the box member. Heating the connection to a temperature below the tempering temperature of the base metal of the connection allows the heat treatment of the pin member and the box member to be preserved. Heating the connection to a temperature above the tempering temperature could change the mechanical properties of the base metal of the connection. In this embodiment, after heating, the connection may have torque applied to a final selected make-up 640. Similar to the torquing to an intermediate selected make-up 620, torque may be applied to the connection until either a selected final make-up torque or a selected relative final position between the pin member and the box member is reached. In one embodiment, the sealing metal, such as gallium, may be selected to have a melting point near the ambient temperature in which the connection will be made up and used. The friction between the pin member and the box member may then generate sufficient heat to sufficiently melt the sealing metal during make-up. In most oilfield applications, the operating temperature resulting from geothermal energy will require a sealing metal with a melting temperature greater than a standard surface ambient temperature. However, the lower melting point may be suitable for non-oilfield applications, or in pipelines transporting fluids at or below the ambient temperature in which the connection will be made-up.

Alternatively, in another method of forming a threaded connection having a sealing metal in accordance with an embodiment of the present invention, after depositing a sealing metal 610 upon the wedge thread connection, torque is applied to an intermediate selected make-up 620. Assuming the torque applied to the connection to an intermediate selected make-up 620 remains applied through heating 630, the need for more torque to be applied to the connection for final selected make-up 640 may be reduced or eliminated. For example, as the sealing metal melts during the heating 630, the torque still being applied from intermediate selected make-up 620 may squeeze-out excess sealing metal from the connection. As excess sealing metal leaves the connection, the connection may further make-up without additional torque being necessary.

Methods of Deposition

Those of ordinary skill in the art will appreciate that a number of techniques may be used to deposit the sealing metal upon the wedge thread connection. For example, the sealing metal may be deposited through an electroplating process, which occurs prior to intermediate selected make-up of the connection. As is known, electroplating can be used to deposit a metal coating on an electrically conductive object. Electroplating involves having the electrically conductive object be applied with a negative charge. The object is immersed into a positively charged solution of metal salts. Metallic ions of the metal salt carry a positive charge and are attracted to the negatively charged electrically conductive object. When the positively charged metallic ion of the metal salts reach the negatively charged object, the negatively charged object provides electrons to "reduce" the positively charged metal ions to metal, depositing the metal on the electrically conductive object. In the present invention, the portion of the threaded connection that may have the sealing metal deposited thereupon may be negatively charge. The negatively charged portion of the threaded connection then may be immersed into a positively charged solution which contains a metallic ions of the sealing metal to be deposited. Upon immersing the negatively charged portion of the threaded connection into the solution, the sealing metal may then be deposited on the threaded connection.

A particular type of electroplating that may be used is known as "brush electroplating." During brush electroplating, an electrically charged brush is guided along the surface of the threaded connection to selectively apply the sealing metal. The brush electroplating technique is particularly useful for convoluted surfaces, such as those on a threaded connection. Regular electroplating, although useable with embodiments of the present invention, may cause the crest radii of the threaded connection to be overcharged relative to the rest of the threaded connection, which may result in too much sealing metal being deposited at the crest radii and/or too little sealing metal in the other portions of the threaded connection. The direct application of the charge using brush electroplating can overcome this difficult and provide a more even distribution of the sealing metal.

In another technique, a sealing metal may originally be disposed as a solid ring about a diameter of the pin member or the box member in a groove. The groove will retain the sealing metal as the pin member and the box member of the wedge thread connection are made-up. At a selected point, such as upon intermediate selected make-up, the assembled connection may be heated to allow the sealing metal to melt and run down the threads of the connection. To assist the flow of the sealing metal down the connection after being melted, the surface of one or both of the threads of the pin member and the box member may be "wetted" with another material to reduce the surface tension. For example, the thread of the pin member may be plated with copper to wet the threads and assist in allowing a tin-indium alloy sealing metal to flow over the threads of the connection.

In another technique, a sealing metal may be melted and directly applied to one of the members of the connection in a dipping process. For example, the pin member or the box member may be immersed into a bath of the melted sealing metal, with areas of the pin member and/or the box member masked to avoid having the sealing metal disposed upon them. Though certain techniques may be more advantageous than others for depositing the sealing metal upon the wedge thread connection, the specific technique used to deposit the sealing metal is not a limitation on the scope of the present invention. Also, those having ordinary skill in the art will appreciate that combinations of these or other techniques may be used.

Methods of Heating

In addition to various deposition techniques for the sealing metal, a number of techniques may be used to heat the connection, including induction heating and conduction heating. In an embodiment in which a wedge thread connection of the present invention is incorporated into oilfield tubulars, the pin member and the box member of the connection may be made-up using standard power tongs. A standard set of power tongs consists of one "power" torque arm with the ability to grip a member of the connection and rotate the member, while the other arm only requires the ability to grip the other member of the connection to hold the member steady. Thus, the connection may be made-up through the power torque arm rotating one member of the connection relative to the other member of the connection. An induction heating coil may be mounted on one of the arms of the power tongs such that the coil could heat the box member of the connection. The heating coil may have a horseshoe shape that can be clamped to partially surround the connection. In most applications, some portion of the connection may not be in direct contact with the heating coil, but the connection is sufficiently conductive in most applications to indirectly heat the portion of the connection that is not directly heated by the heating coil. The heating coil may be placed over the connection before the power tongs grip the connection, with the power tongs then allowed to torque to an intermediate selected make-up. After intermediate selected make-up is reached, the heating coil may be given amperage to heat the connection. The heating coil may be fitted with a temperature sensor, such as an infrared pyrometer, to monitor the specific temperature of the connection during heating. When heating with the induction coil, a pre-determined amperage may be applied to the induction coil to only heat the connection to a specific temperature. The pre-determined amperage applied to the induction heating coil to heat the connection may be dependent upon several factors, such as pipe diameter, pipe thickness, pipe weight, and ambient temperature of the pipe.

As the induction coil provides the predetermined amperage, the power tongs may apply torque to final selected make-up of the connection. As the wedge thread connection has torque applied with a temperature above the melting point of the sealing metal, the melted sealing metal may be forced into the selected clearances between the wedge threads if selected clearances are present, or may also be forced out of the connection if enough torque is applied. The process of applying additional torque may continue then until final selected make-up is achieved.

Alternatively, the induction heating coil may be given amperage at the same time as the power tongs begin to apply torque to final selected make-up of the wedge thread connection. The connection then may the have torque applied for final selected make-up until a predetermined temperature of the connection, as indicated by the temperature sensor, is reached.

In another technique of heating the connection, the connection may be heated using a conduction heating technique. The connection may have torque applied to intermediate selective make-up of the connection using a standard set of power tongs. After intermediate selected make-up, the connection may be heated using conduction heating, such as a propane torch. As the connection is heated with the propane torch, further torque may be applied to a final selected make-up. As more torque is applied to the wedge thread connection, the sealing metal may melt in the connection and relocate or squeeze-out, dependent upon the amount of torque applied to the connection and the specific features of the connection. Though certain techniques may be more advantageous than others for heating the wedge thread connection, the specific technique used in heating the connection is not a limitation on the scope of the present invention. Also, those having ordinary skill in the art will appreciate that combinations of these or other techniques may be used.

EXAMPLE APPLICATIONS

Figure 1:
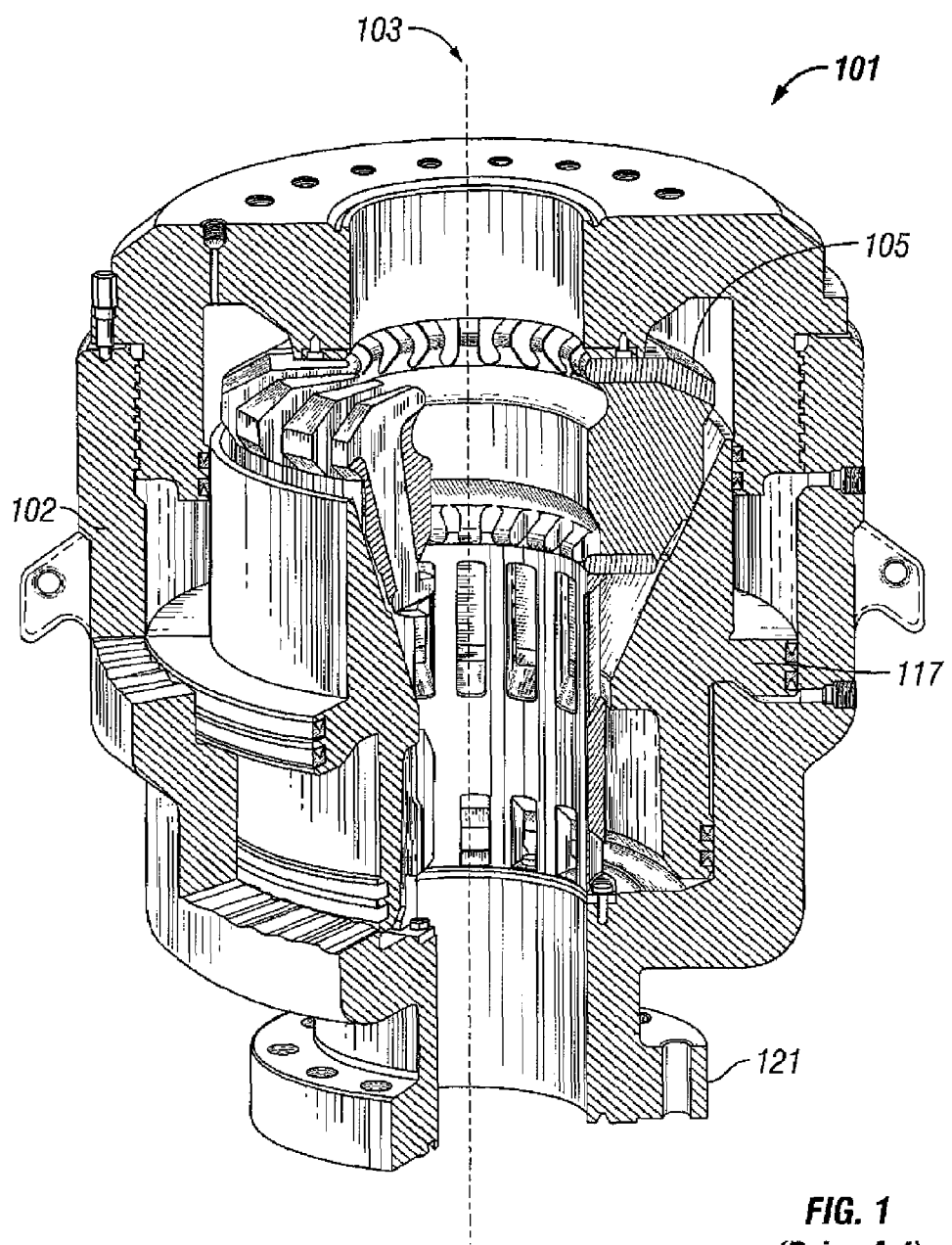
FIG. 1 shows a prior art annular blowout preventer.

As mentioned above, with an improved sealing ability of a wedge thread connection, wedge threads may be incorporated into other applications, oilfield related or not. FIG. 1 shows a prior art annular BOP 101. The BOP 101 includes a BOP body 102 with a flange 121. The flange 121 of the body 102 enables the BOP 101 to be secured to other blowout preventers or to conductor pipe at the surface of a wellbore. A packing unit 105 and a piston 117 are disposed within the annular BOP 101 about a longitudinal axis 103. The BOP 101 is actuated by fluid pressure to move the piston 117 up and down to allow the packing unit 105 to radially compress or expand.

Figure 5A:
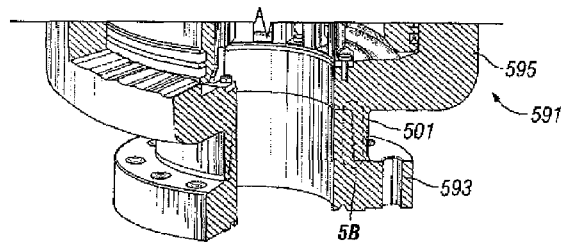
FIG. 5 shows a blowout preventer having a connection with wedge threads in accordance with an embodiment of the present invention.
Figure 5C:
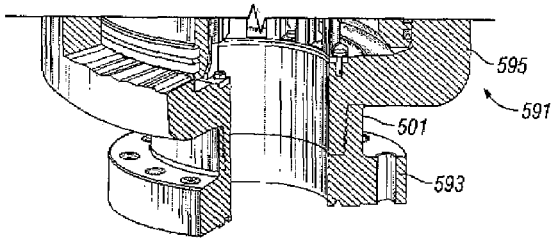
Figure 5B:
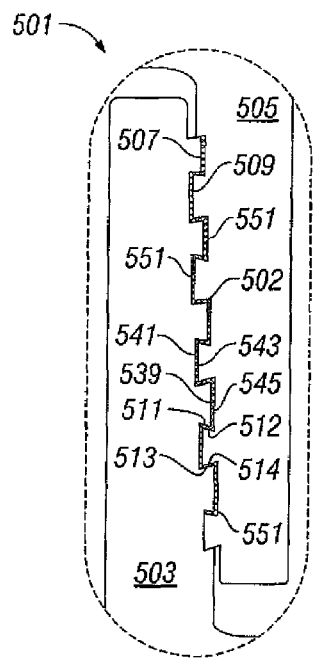

A BOP is used to seal a wellbore, in which the blowout preventer will be required to contain substantially high pressures of liquids, gases, or a combination thereof. A wedge thread connection with a sealing metal in an embodiment of the present invention may have improved sealing ability appropriate for sealing against gases and liquids under high internal pressure, and thus may be incorporated into an oilfield application such as a BOP. A BOP 591 with a threaded connection 501 in accordance with an embodiment of the present invention is shown in FIG. 5. The BOP 591 includes a BOP body 595 and a BOP flange 593. The BOP body 595 is connected to the BOP flange 593 using a threaded connection 501. A pin member 503 is then disposed upon the BOP flange 593, and a box member 505 is disposed upon the BOP body 595. The pin member 503 of the BOP flange 593 has a tapered thread 507 with flanks 511 and 513, crest 539, and root 541. The box member 505 on the BOP body 595 has a tapered thread 509 with flanks 512 and 514, crest 543, and root 545. The threads 507 and 509, which make-up with one another, are wedge threads. A sealing metal 551 is disposed between the threads 507 and 509. Specifically, the sealing metal 551 is disposed in this embodiment as a layer between all of the roots, crests, and flanks of the pin member and the box member. However, as mentioned previously, the specific location of the sealing metal on the wedge threads of the connection is not a limitation on the scope of the present invention. Further, those having ordinary skill in the art will appreciate that in other embodiments, the pin member may be disposed upon the BOP body and the box member may be disposed upon the BOP flange. For example, as shown in FIG. 5C, the pin member may be disposed upon the BOP body 595, and the box member may be disposed upon the BOP flange 593.

As mentioned with reference to threads 507 and 509 of FIG. 5, in addition to the threads 307, 309, 407, and 409 of FIGS. 3 and 4, the embodiments shown all have tapered threads. However, in other embodiments, the threads may be cylindrical. For use in a threaded connection of a BOP, a wedge thread with minimal or zero taper is preferable. A wedge thread connection used within a BOP, as shown in FIG. 5, could experience primarily tensile loads, and need to be rarely broken-out. In such cases, maximizing the height of the load flanks of the pin and box members, and thus minimizing the taper of the threads in the wedge thread connection, could be desirable for the connection to be most suitable for tensile loading. However, the specific amount of taper or use of taper within the wedge thread connection is not a limitation on the scope of the present invention.

As mentioned above, a threaded connection in accordance with an embodiment of the present invention may have improved sealing capability. The sealing metal disposed on at least a portion of the wedge threads may improve the threaded connections ability to seal against high internal pressures and gases and liquids. When containing high internal pressures, a BOP may radially expand. When using a threaded connection within a BOP, the expansion of the BOP could impose a bending moment across the threaded connection between the BOP body and the flange. The use of the sealing metal across the wedge thread connection may improve the ability of the connection to seal and contain the internal pressures. Also, because a bending moment may be imposed upon the threaded connection, a dovetail thread form may be preferable for the wedge thread. As mentioned previously though, certain thread forms can be advantageous to other thread forms, but the specific thread form used is not a limitation on the scope of the present invention.

A threaded connection in accordance with an embodiment of the present invention may increase the resistance of the threaded connection to being broken-out. When the sealing metal is deposited upon the threaded connection, diffusion of the sealing metal into the base metal may occur. This diffusion may then increase as pressure and force upon the sealing metal are increased. Diffusion of the sealing metal into the base metal may increase the break-out torque. In uses of a threaded connection which may not be made-up and broken-out frequently, the resistance of a threaded connection of the present invention may help prevent accidental break-out or loosening of the connection. Additionally, the threaded connection of the present invention may be designed to have a pre-determined break-out torque. For a connection that is semi-permanent, meaning that it may not be broken-out frequently, a threaded connection may be made with a high pre-determined break-out torque. Likewise, for a connection which may be broken-out more frequently, a threaded connection may be made with a lower pre-determined break-out torque. For the highest break-out torque, a thin layer of the sealing metal may be deposited upon the wedge thread connection. For the lowest break-out torque, a thick layer of the sealing metal may be deposited upon the wedge thread connection.

High contact pressure, about 50 to 100 MPa (8 to 15 ksi), is generated between corresponding flanks of the pin thread and the box thread during make-up. This characteristic of wedge threads can be used to achieve "squeeze casting" of the sealing metal. Subjecting the liquid sealing metal, or near liquid if slightly below the melting point, to high pressures can result in improved densification of the sealing metal. Also, the squeeze casting provides a more intimate contact between the roots, crests, and corresponding flanks, which helps to achieve uniform properties and improved sealing in the connection. Further, if the pressure is maintained during cooling of the sealing metal, as is the case in a wedge thread, finer grains and finer dendrites may be achieved in the solidified sealing metal, which can provide improved mechanical properties.

To take advantage of the improved mechanical properties available from squeeze casting, the connection may be quenched after final make-up. If the connection is to be used in a wellbore, then quenching will occur by lowering the connection into the wellbore. Alternatively, the connection may be sprayed with water or other readily available liquid after final make-up. If the connection is subsequently reheated to a temperature near the melting point of the sealing metal, grains in the sealing metal may continue to grow, which could result in the loss of some of the favorable mechanical properties resulting from the refined grains. To avoid this situation, the sealing metal may be selected to have a melting point some margin greater than the environment in which the connection will be used. For example, in one embodiment, the sealing metal may have a melting point 10 percent to 100 percent greater than the intended operating temperature.

Advantages

Embodiments of the present invention may have one or more of the following advantages. With the threaded connection of the present invention incorporated into a BOP, BOPs may be more economically manufactured for specific size requirements. For example, when a customer's order is received by a BOP manufacturing company with specific size requirements for drill pipe sealing size, necessary pressure constraints of the BOP, and the size of flange for securing the BOP, BOP bodies and flanges may be assembled together with a threaded connection of the present invention. This may avoid having to manufacture a BOP for each necessary combination of size requirements for each customer. BOP bodies may be pre-fabricated and placed in inventory, and when specific size requirements are received, an appropriate flange may be manufactured and assembled with a pre-fabricated BOP body within inventory, reducing delivery time.

Additionally, the use of a threaded connection to assemble a BOP with a flange could allow for a more economical rebuild of the BOP. Damaged parts of the BOP may be easily removed by breaking-out the connection of the BOP and replacing the damaged parts with new or restored BOP parts. This may avoid having to replace the entire BOP when only certain parts of the BOP are damaged. Further, a BOP in accordance with an embodiment of the present invention may be refitted with different parts as needed for different applications. For example, the flange on a BOP may be replaced to allow the BOP to be moved between different sized BOPs, or be moved between different sized conductor pipe, or any combination of the two.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection comprising:
   a pin member having a pin thread formed thereon, wherein the pin thread comprises a wedge thread comprising a pin thread crest, a pin thread root, a pin load flank, and a pin stab flank;
   a box member having a box thread formed thereon, wherein the box thread comprises a wedge thread comprising a box thread crest, a box thread root, a box load flank, and a box stab flank; and
   a sealing metal disposed at least between the pin thread and the box thread,
   wherein the sealing metal has a lower melting point than a tempering temperature of the pin and the box member,
   wherein upon a selected make-up of the pin member and the box member a selected clearance exists between at least a portion of the pin thread and the box thread, wherein the sealing metal is disposed in the selected clearance between the pin thread and the box thread, and wherein the selected clearance is volume balanced.

2. The threaded connection of claim 1, wherein the sealing metal has a lower hardness than the pin member and the box member.

3. The thread connection of claim 1, wherein the pin member is disposed on a blowout preventer body and the box member is disposed on a flange.

4. The threaded connection of claim 1, wherein the pin member is disposed on a flange and the box member is disposed on a blowout preventer body.

5. The threaded connection of claim 1, wherein the pin member and the box member are disposed on oilfield tubulars.

6. The threaded connection of claim 1, wherein the melting point of the sealing metal is greater than an operating temperature for the threaded connection.

7. The threaded connection of claim 6, wherein the melting point of the sealing metal is about twice the operating temperature for the threaded connection.

8. The threaded connection of claim 1, wherein said selected clearance exists between pin thread crests of said pin member and box thread roots of said box member and between pin thread roots of said pin member and box thread crests of said box member.

9. The threaded connection of claim 8, wherein a volume of said selected clearance is determined to accommodate said sealing metal disposed (1) between said pin thread crests and said box thread roots, (2) between said pin thread roots and said box thread crests, (3) between pin thread load flanks and box thread load flanks, and (4) between pin thread stab flanks and box thread stab flanks.

10. A threaded connection comprising:

a pin member having a pin thread formed thereon, wherein the pin thread comprises a wedge thread comprising a pin thread crest, a pin thread root, a pin load flank, and a pin stab flank;

a box member having a box thread formed thereon, wherein the box thread comprises a wedge thread comprising a box thread crest, a box thread root, a box load flank, and a box stab flank; and a sealing metal disposed at least between the pin thread and the box thread, wherein the sealing metal has a lower melting point than a tempering temperature of the pin and the box member, and wherein the sealing metal is an alloy of about 90 wt. % tin and about 10 wt. % indium.

11. A threaded connection comprising:

a pin member having a pin thread formed thereon, wherein the pin thread comprises a wedge thread comprising a pin thread crest, a pin thread root, a pin load flank, and a pin stab flank;

a box member having a box thread formed thereon, wherein the box thread comprises a wedge thread comprising a box thread crest, a box thread root, a box load flank, and a box stab flank; and a sealing metal disposed at least between the pin thread and the box thread, wherein the sealing metal has a lower melting point than a tempering temperature of the pin and the box member, and wherein the sealing metal is an alloy of about 95 wt. % tin and about 5 wt. % indium.

12. A threaded connection comprising:

a pin member having a pin thread formed thereon, wherein the pin thread comprises a wedge thread comprising a pin thread crest, a pin thread root, a pin load flank, and a pin stab flank;

a box member having a box thread formed thereon, wherein the box thread comprises a wedge thread comprising a box thread crest, a box thread root, a box load flank, and a box stab flank; and a sealing metal disposed at least between the pin thread and the box thread, wherein the sealing metal has a lower melting point than a tempering temperature of the pin and the box member, and wherein the sealing metal is a eutectic mixture.

13. The threaded connection of claim 12, wherein upon a selected make-up of the pin member and the box member a selected clearance exists between at least a portion of the pin thread and the box thread.

14. The threaded connection of claim 13, wherein the sealing metal is disposed in the selected clearance between the pin thread and the box thread.

15. The threaded connection of claim 14, wherein the selected clearance is volume balanced.

16. The threaded connection of claim 12, wherein the sealing metal is an alloy of about 90 wt. % tin and about 10 wt. % indium.

17. The threaded connection of claim 12, wherein the sealing metal is an alloy of about 95 wt. % tin and about 5 wt. % indium.

18. The threaded connection of claim 12, wherein the sealing metal has a lower hardness than the pin member and the box member.

19. The thread connection of claim 12, wherein the pin member is disposed on a blowout preventer body and the box member is disposed on a flange.

20. The threaded connection of claim 12, wherein the pin member is disposed on a flange and the box member is disposed on a blowout preventer body.

21. The threaded connection of claim 12, wherein the pin member and the box member are disposed on oilfield tubulars.

22. The threaded connection of claim 12, wherein the melting point of the sealing metal is greater than an operating temperature for the threaded connection.

23. The threaded connection of claim 12, wherein the melting point of the sealing metal is about twice the operating temperature for the threaded connection.

* * * * *

UNITED STATES PATENT AND TRADEMARK OFFICE
CERTIFICATE OF CORRECTION

| | | |
|---|---|---|
| PATENT NO. | : 7,562,911 B2 | Page 1 of 1 |
| APPLICATION NO. | : 11/337994 | |
| DATED | : July 21, 2009 | |
| INVENTOR(S) | : Reynolds, Jr. et al. | |

It is certified that error appears in the above-identified patent and that said Letters Patent is hereby corrected as shown below:

In Column 13, Line 14, in Claim 5, delete "oifleld" and insert -- oilfield --, therefor.

In Column 14, Line 48, in Claim 21, delete "oilfleld" and insert -- oilfield --, therefor.

Signed and Sealed this

Twenty-fifth Day of August, 2009

David J. Kappos
*Director of the United States Patent and Trademark Office*